United States Patent Office 3,497,386
Patented Feb. 24, 1970

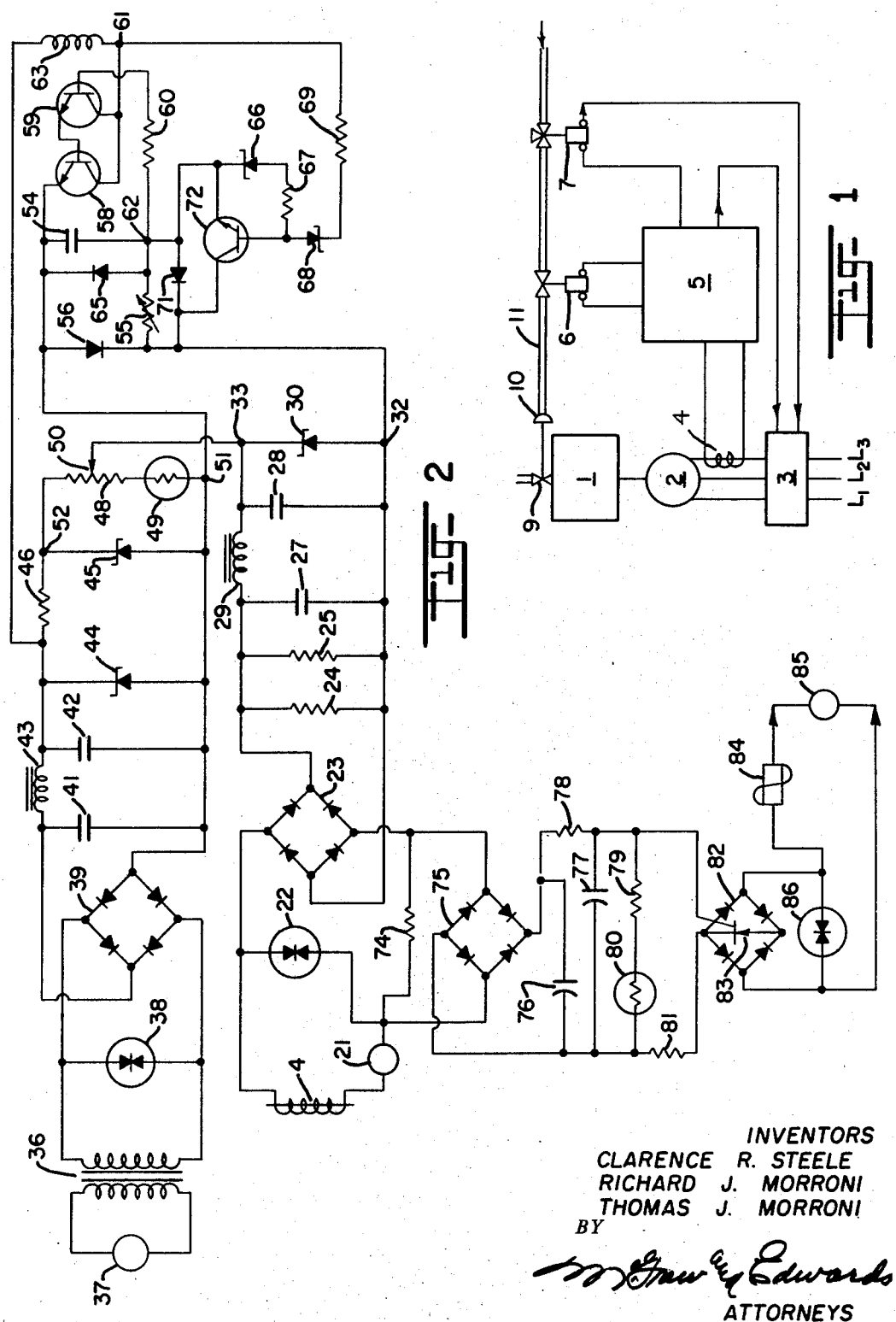

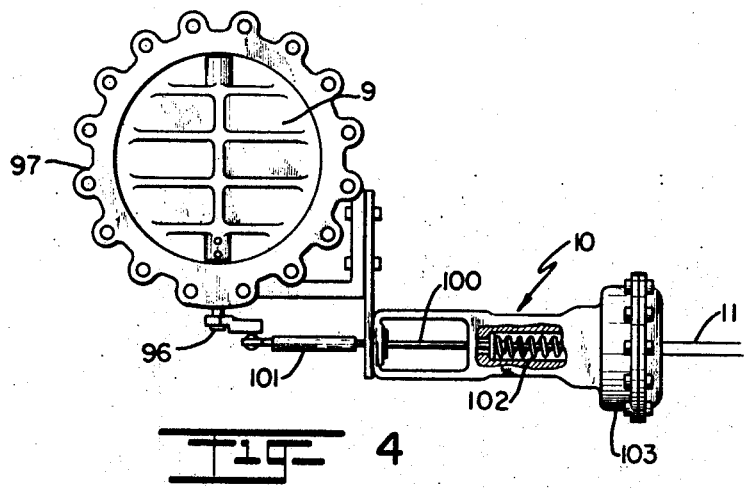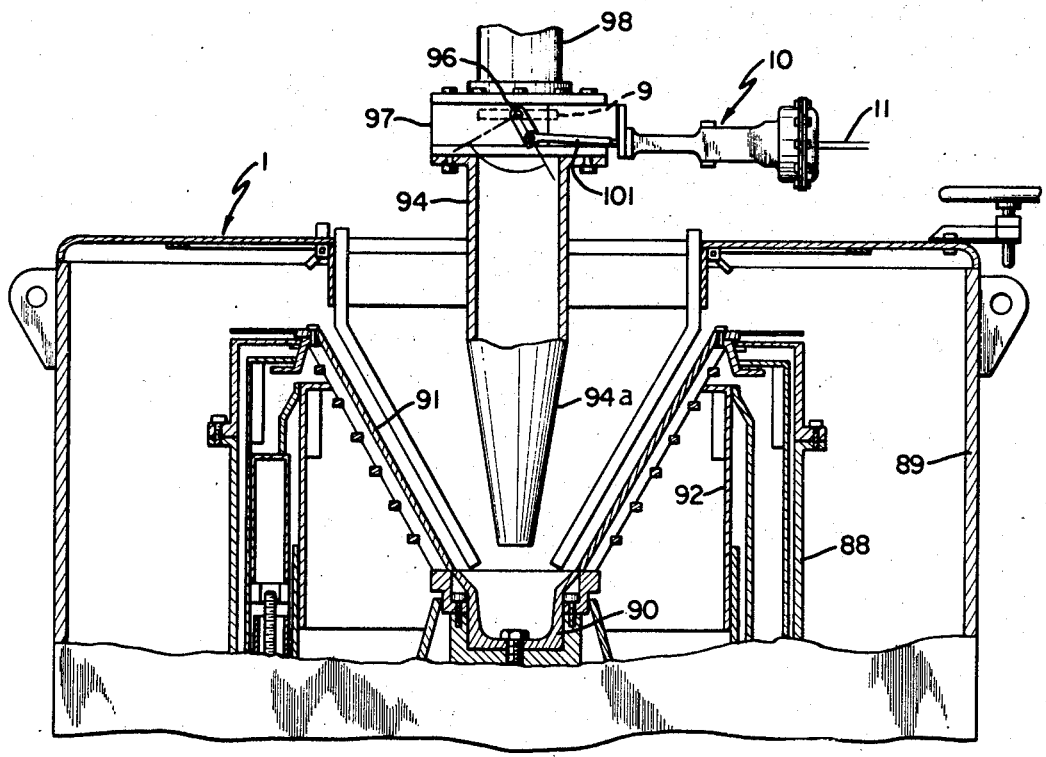

3,497,386
AUTOMATIC CONTROL SYSTEM FOR LOAD-CARRYING ROTORS
Clarence R. Steele, Richard J. Morroni, and Thomas J. Morroni, Denver, Colo., assignors to American Factors Associates, Limited, Honolulu, Hawaii, a corporation of Delaware
Filed Sept. 29, 1965, Ser. No. 491,372
Int. Cl. B04b 3/00
U.S. Cl. 127—19                13 Claims

ABSTRACT OF THE DISCLOSURE

An automatic control system for motor driven load-carrying rotors and particularly continuous centrifugal apparatus having a feed inlet for solution to be treated including an adjustable self closing valve in the feed inlet, a pneumatic transducer means for opening the valve to a selected setting when actuated, sensing means in the motor circuit, and control means including one electric circuit portion responsive to the sensing means for actuating the pneumatic transducer means for setting the feed inlet valve to maintain a constant load on the centrifugal and to deactuate the transducer means to close the valve during excessive motor overload and another circuit portion for deactuating the pneumatic means when the motor is not in loaded driving relation to the basket such as when the coupling between the motor and centrifugal breaks.

---

This invention relates to control systems using the load as the indicator and more particularly to feed control systems using the motor load as the indicator for continuous centrifugals of the type disclosed in application Ser. No. 456,439, filed May 17, 1965, and owned by the assignee of this application.

The liquid and solid phases of solids-containing solutions, such as massecuite in sugar processing, are commonly separated in continuous centrifugals. It has been found that a uniform quality of product in these centrifugals may be attained if the load on the centrifugal basket is maintained substantially constant. Manually-operated valves controlling the feed inlet to continuous centrifugals do not account for changes in head, fluidity and the like of the incoming feed of solids-containing solutions which unbalance the load on the centrifugal basket. Malfunctions in the centrifugal system, such as a sudden surge from the feed supply or a failure of the drive, are not detected by manually operated valves and may result in extreme overloading or damage to the centriufgal or flooding of material with resultant damage to the product.

Accordingly, it is an object of this invention to provide an improved feed control system for a continuous centrifugal which maintains a substantially constant load on the basket of the centrifugal.

Another object of this invention is to provide an improved feed control system for a continuous centrifugal which acts quickly to cut off the feed to the basket in the event of various malfunctions in the centrifugal apparatus.

It is a further object of this invention to provide a novel feed control system for a continuous centrifugal which employs electronic circuitry to control the feed valve.

Still another object of our invention is to provide an automatic control system for a motor driven rotor where it is desired to use the motor load as an indicator of control requirements.

Other objects and advantages of this invention will become apparent from the following description with reference to the accompanying drawings in which:

FIG. 1 is a schematic diagram of a feed control system for a continuous centrifugal embodying this invention;

FIG. 2 is an electrical circuit diagram of an electronic control referred to as block 5 in FIG. 1;

FIG. 3 is a fragmentary vertical section through a continuous centrifugal with a feed inlet valve and pneumatic to mechanical transducer mounted thereon embodying features of this invention; and FIG. 4 is a top plan view of the feed inlet valve and pneumatic to mechanical transducer of FIG. 3 drawn to an enlarged scale with the supply line removed to show the butterfly valve and a portion of the operator housing broken away to show the biasing spring.

Referring now to FIG. 1, the general arrangement of the feed control system will first be described with reference to the operation of a continuous centrifugal separator, but the control system may be applied to any motor driven rotor where it is desired to use the motor load as an indicator of control requirements. A continuous centrifugal 1 is driven preferably through a belt transmission by an electrical motor 2 which is powered by a conventional three phase A.C. power source indicated at L1, L2 and L3 through a motor starter 3.

The load on the centrifugal 1 is measured by a current transformer 4 which is connected to the input of electronic control 5 having outputs connected to an electro-pneumatic transducer 6, a pneumatic solenoid valve 7, and a connection to the starter coil in motor starter 3.

A valve 9 for regulating the feed to the centrifugal 1 is pneumatically adjusted by a self-closing pneumatic to mechanical transducer which is used as a valve actuator 10 having an air intake line 11 connected thereto and suitably supplied by a stream of air at its intake end. The valve portions of transducer 6 and solenoid valve 7 are connected in line 11 to regulate the supply of air to transducer 10 with the electrical winding portions of 6 and 7 regulated by the electronic control 5 in accordance with the load on the centrifugal 1, thereby adjusting valve 9 and the feed inlet to centrifugal 1 in accordance with the load on the centrifugal 1.

In FIG. 2 a preferred circuit for the electronic control is shown. An ammeter 21 is connected in series with the current transformer 4 to indicate line current and a symmetrical Zener diode 22 is connected across the current transformer to protect the electronic control against excessive surges of line voltage. A bridge rectifier 23 is connected across current transformer 4 comprising four diodes. A pair of parallel resistors 24 and 25 are connected across the output of the bridge rectifier 23 which function as loading resistors for the current transformer 4.

A filter network comprising a pair of parallel capacitors 27 and 28 with a reactor coil 29 connected therebetween is connected across the output of rectifier 23. Zener diode 30 is connected across the filter network for voltage limitation. The output across Zener diode 30 is designated by terminals 32 and 33 with terminal 33 being the positive or output terminal which during operation has a voltage proportioned to load and terminal 32 being the zero potential terminal.

A reference circuit provides a variable unidirectional or D.C. reference voltage in the electronic control 5. This reference circuit includes a transformer 36 having its primary winding connected to a suitable A.C. power supply 37. A symmetrical Zener diode 38 is connected across its secondary winding for voltage surge protection. In parallel with the secondary winding there is connected a bridge rectifier 39 comprising four diodes. The output of this bridge is filtered by a filter network connected across the bridge which comprises a pair of parallel capacitors 41 and 42 with a reactor coil 43 connected therebetween. Across the filter network there is connected two Zener diodes 44 and 45 with a resistor 46 connected therebetween so that a stabilized D.C. voltage appears across Zener diode 45 and a set point or slide wire potentiometer 48 in series with a temperature compensating resistor 49 at terminals 51 and 52.

The set point potentiometer 48 has a slidable tap connection 50 which is connected to output terminal 33 hereinabove described. Output terminal 33 is polarized with respect to the variable reference voltage of the potentiometer between terminals 51 and tap 50 so that it opposes or subtracts from this potentiometer voltage. The difference in these two voltages appears as a comparison output at terminal 51.

An integrating network comprising a serially connected capacitor 54 and variable resistor 55 is connected to output terminal 51. A diode 56 is connected between terminal 51 and resistor 55 to protect against reverse voltage in the capacitor 54. A diode 65 is connected across capacitor 54 which functions as a voltage limit diode for this capacitor.

The output of the integrating network is connected to a two-stage transistor amplifier circuit. This circuit includes a pair of NPN transistors 58 and 59 with the emitter of transistor 58 connected to the output of one side of the above referred to integrating network. The base of transistor 58 is connected to the emitter of transistor 59 and a resistor 60 is connected between the base of transistor 59 and a terminal 62 common to capacitor 54 and resistor 55. The collectors of transistors 58 and 59 are commonly connected to terminal 61 which is the output terminal of the transistor amplifier and also an output or load terminal of the electronic control 5. Temperature compensating resistor 49 hereinabove described in series with potentiometer 48 reduces the drift in the tap setting of the potentiometer 48 which would otherwise occur due to temperature effects in this amplifier. The amplifier circuit is supplied from a regulated power supply which consists of the above mentioned devices 36, 38, 39, 41, 42, 43, 44 to prevent changes which would otherwise result from line voltage variations.

Electro-pneumatic transducer 6 includes an electrical winding 63 which is the load connected to terminal 61 at the output of the transistor amplifier circuit. The opposite end of winding 63 is connected to Zener diode 44 to complete the electrical circuit.

A rapid-start circuit is connected between output terminal 61 and common terminal 62 of integrating capacitor 54. This circuit has connected in series, resistor 69, Zener diode 68 and the base and emitter of an NPN transistor 72. A diode 71 is connected across the emitter and collector of transistor 72 and between common terminals 62 and terminal 32 with a Zener diode 66 and a resistor 67 connected between its base and emitter to complete a transistor amplifier circuit.

A minimum load sensing circuit which includes a resistor 74 is connected in series with current transformer 4 to sense load current. For rectifying the A.C. voltage across resistor 74 there is provided a bridge rectifier 75 comprising four diodes. The output of the rectifier is filtered by a filter network comprising a pair of parallel capacitors 76 and 77 with a resistor 78 connected therebetween and temperature compensated by a serially connected temperature sensitive resistor 80 and current limiting resistor 79 connected across the output of the filter network.

The minimum load sensing circuit includes a solid state switch having a bridge rectifier 82 comprising four diodes and a silicon controlled rectifier 83 connected in the bridge rectifier 82. The gate electrode of silicon controlled rectifier 83 is connected to said temperature compensated output of the filter network. The anode and cathode electrodes of the silicon controlled rectifier are connected across the bridge and a resistor 81 is connected to the cathode electrode. Across the output of the switching circuit there is serially connected an electrical winding portion 84 of pneumatic solenoid valve 7 and the starter coil 85 in motor starter 3. A symmetrical Zener diode 86 is connected across the switch for voltage surge protection.

The continuous centrifugal generally indicated by numeral 1 may be any of various types of known continuous centrifugals and the general structure of a preferred continuous centrifugal which has been described fully in application Ser. No. 143,892, filed Oct. 9, 1916, has been included for purposes of describing this invention.

Continuous centrifugal 1 generally includes an inner housing 88 and an outer housing 89. The basket of the centrifugal includes an accelerator bowl portion 90 which is disposed centrally of the inner housing and is supported on rotary drive member having a sheave (not shown) to which the shaft of motor 2 is coupled by belting or the like for high speed rotation of the basket. An upright perforated portion 91 of generally frustoconical shape and having a skeletal support extends upwardly from the accelerator bowl portion 90 and terminates in a flanged portion extending over the outer wall to discharge overflow between the inner and outer housings. An adjustable partition assembly 92 is disposed within the inner housing to selectively cut the liquid which flows through the basket.

A feed conduit 94 extends through an opening in a cover assembly across the top of the outer housing 89. The lower portion 94a of this conduit tapers inwardly and extends into the basket above the accelerator bowl portion to discharge the incoming feed into the accelerator bowl portion.

A butterfly valve 9 is mounted on a support rod 96 pivotally supported on a valve housing 97 which is secured between feed conduit 94 and a feed transport or supply line 98 leading from a feed supply by fasteners and thereby controls the opening at the intake of feed conduit 94 from fully closed as shown to a substantially open position.

The rotation of the butterfly valve 9 is controlled by transducer 10. Transducer 10 has an output rod 100 connected through linkage 101 to pivot rod 96 to rotate the valve in response to lineal movement of rod 100. A spring bias 102 normaly holds or biases the output rod to close the valve as shown in FIGS. 3 and 4. Transducer 10 includes an operator housing 103 which receives the air supplied through line 11 and moves rod 100 in proportion to the air pressure against the spring bias to open the valve. In this manner, by controlling the air in line 11 through the pneumatic valve portions of transducer 6 and valve 7 heretofore described in FIG. 1, the opening and closing of the valve 9 is accomplished. In the event the air to the transducer 10 is fully cut off from line 11, spring 102 through rod 100, linkage 101, and rod 96 automatically closes the valve 9 to shut off the feed to the centrifugal.

The operation of the above described system will now be explained with reference to various centrifugal basket and motor load conditions. The load on a running centrifugal is determined by that quantity of feed material in the basket which is being accelerated by the centrifugal. Some changes in this normal or full load commonly result from changes in the feed head and changes in fluidity and the like and are hereinafter referred to as load changes. In some instances there is a sudden surge of material into the basket following a supply failure or the like. This is hereinafter referred to as an excessive overload. Start-up refers to the time it takes the motor to accelerate the centrifugal basket up to full speed. Motor underload describes the condition when the motor current is below the value necesary to rotate an unloaded centrifugal basket and commonly occurs when the belt transmission between the motor and centrifugal breaks.

A portion of the control system adjusts valve 9 to compensate for load changes on the centrifugal basket to maintain a substantially constant load on the centrifugal basket. The output of transformer 4 is rectified by rectifier 23, filtered by filter 27, 28, 29 and appears at terminal 33 as a unidirectional voltage proportioned to the load on the centrifugal basket. This voltage is applied to tap 50 and is polarized such that it subtracts from the reference voltage between tap 50 and 51 of set point potentiometer 48 and the result of this comparison or subtraction appears at terminal 51 which is then applied to integrating network 54, 55. This integrating network has a variable time constant which allows field adjustment to provide maximum response without causing hunting which would otherwise occur. The values of capacitor 54 and resistor 55 of the integrating network provides a corrective action at a rate which is proportional to the change or deviation from the voltage at 33 as long as this voltage is less than the variable reference voltage between tap 50 and terminal 51.

The output of the integrating circuit is amplified by transistors 58 and 59 and the output of the amplifier is applied to winding 63 of the electro-pneumatic transducer 6, the valve portion of which alters the air inlet through line 11 to transducer 10 and adjusts valve 9 through linkage 101 and pivot rod 96.

For example, if during the feeding operation the load on centrifugal basket increases above normal load, the current induced in transformer 4 increases making the difference-voltage at terminal 51 less, which in turn decreases the amplifier output at terminal 61 to decrease the air inlet in line 11 to operator housing 103 which reduces the load resisting the spring 102 allowing this spring to move rod 100, linkage 101, and rod 96 to reduce the inlet opening through conduit 94 and cut down the feed to the centrifugal bowl portion 90. Conversely, if during the feeding operation the load on the centrifugal decreases below normal load, the current induced in transformer 4 decreases making the difference-voltage at terminal 51 greater, which in turn increases the amplifier output at terminal 61 to increase the air inlet in line 11 to operator housing 103 which increases the load resisting the spring 102 moving rod 100, linkage 101 and rod 96 to increase the inlet opening through conduit 94 to increase the feed to the centrifugal bowl portion 90.

During an excessive overload, the system operates with the same circuitry as for load change to close valve 9. In this instance, the voltage appearing at terminal 33 is in excess of the variable reference voltage between tap 50 and terminal 51, which changes the polarity at terminal 51. At this point, the integrating circuit is bypassed by diode 71 and the voltage at terminal 61 is not sufficient to actuate the valve portion of transducer 6 and the air inlet through line 11 is shut off. When this air is shut off the spring bias 102 of transducer 10 moves to close valve 9 and shut off the feed to the centrifugal.

Referring now to the start-up operation, the centrifugal basket and associated rotary structure has a large WR² which requires substantial time for the motor 2 to accelerate its load up to speed. This motor load creates a high starting current in the motor line which would otherwise affect the circuit of control 5 for an extended period of time because this high surge of current reverses the charge on capacitor 54. However, as soon as the high starting current reduces to normal due to the centrifugal coming up to speed, this reverse charge on capacitor 54 is neutralized by the action of transistor 72. The reverse charge on capacitor 54 turns off the transistor amplifier and a positive voltage appears at terminal 61 because of this action. This positive voltage causes Zener diode 68 to break down and a voltage is applied to common terminal 62 of the integrating capacitor 54 due to amplification by transistor 72 to reverse the charge on capacitor 54. At this time, the capacitor 54 voltage is such as to allow transistors 58 and 59 to conduct, thus allowing sufficient voltage to appear at terminal 61 to open valve 9. After the voltage at terminal 61 changes sufficiently, Zener diode 68 shuts the quick-start circuit off and the valve 9 is thereafter opened under the control of the integrating network. The quick-start circuit shuts off at a point which coincides with the point where valve 9 just begins to open.

Current transformer 4 has special saturation features and saturates at 10% above full load to protect the electrical circuitry connected thereto against very high motor starting current while the motor is accelerating the centrifugal basket up to speed. Because of this feature, no hazardous voltages can appear at the current transformer secondary even if the circuitry of the electronic control 5 is disconnected without short circuiting the current transformer secondary.

In the event of a motor underload resulting from a broken belt, the minimum load sensing circuit takes effect. The voltage drop across resistor 74 which is rectified by rectifier 75, filtered by filters 76, 77 and 78 and temperature compensated by resistor 80 is of a magnitude to cause silicon controlled rectifier 83 to switch, deenergizing coil 84 of pneumatic valve 7. The valve portion of valve 7 shuts off the air inlet to transducer 10 allowing its biasing spring to close valve 9 to prevent flooding of the centrifugal basket.

We claim:
1. A feed control system for a continuous centrifugal having a motor driven basket and an inlet for solids-containing solution, said system comprising a valve in said inlet, pneumatic means biasing the valve closed and opening the valve when actuated, and control means sensing the load on the centrifugal and activating said pneumatic means for changing the valve setting for maintaining a constant load on the centrifugal and to deactuate the pneumatic means so as to close the valve during an excessive motor underload.

2. A feed control system according to claim 1 wherein said control means includes a circuit portion for neutralizing the effect of surge voltage produced by the motor when the motor brings the centrifugal basket up to speed.

3. A feed control system for a continuous centrifugal having a centrifuge basket mounted for rotation, an inlet for solids-containing solution to be treated, and a motor with belt transmission between the motor and the basket for rotating the basket, said system comprising a valve in the inlet, pneumatic means normally closing the valve and opening the valve when actuated, and control means responsive to the load on the centrifugal for actuating the pneumatic means so as to close the valve when said belt transmission fails to prevent flooding of the centrifugal basket.

4. A feed control system for a continuous centrifugal having a centrifuge basket mounted for rotation, an inlet for solids-containing solution to be treated, and a motor with belt transmission between the motor and the basket for rotating the basket, said system comprising a valve in the inlet, pneumatic means normally closing the valve and opening the valve when actuated, and control means responsive to the load on the centrifugal for actuating the pneumatic means so as to close the valve when the motor current is below the value necessary to rotate an unloaded centrifugal basket.

5. A feed control system for a continuous centrifugal having a motor driven basket and an inlet for solids-containing solution, said system comprising a valve in the inlet, pneumatic means biasing the valve closed and opening the valve when operated, transducer means having a valve output for regulating the input to the pneumatic means, electrical means for measuring the current drawn by said motor, and electrical control means connected between the input of said transducer means and output of said electrical means, said control including a first electrical circuit for varying the transducer means in accordance with the load on the centrifugal basket to maintain this load substantially constant and for shutting off the transducer means during an excessive overload on the centrifugal basket, a second electrical circuit for shutting off the transducer means during excessive underload of the centrifugal motor, and a third electrical circuit for modifying the first electrical circuit to neutralize the effect of surge voltage produced by the motor when the motor is accelerating the basket load up to speed.

6. A feed control system for a continuous centrifugal having a motor driven basket and an inlet for solids-containing solution, said system comprising a valve in the inlet, a trandsucer having a mechanical output connected to the valve and an air input and spring biased to close the valve when the air input is off, transducer means having a valve output for regulating the air input to the transducer, a self-saturating current transformer in the motor line for measuring the current dawn by said motor, and electrical control means connected between the input of said transducer means and output of said current transformer, said control including a first electrical circuit inclusive of an integrating network for varying the transducer means in accordance with the load on the centrifugal basket to maintain this load substantially constant and for shutting off the transducer means during an electrical overload on the centrifugal basket, a second electrical circuit for shutting off the transducer means during excessive underload of the centrifugal motor, and a third electrical circuit for modifying the integrating network for neutralizing the effect of surge voltage produced by the motor when the motor is accelerating the basket up to speed.

7. A feed control system for a continuous centrifugal having a motor driven basket and an inlet for solids containing solution, said system comprising a valve in said inlet, pneumatic means biasing the valve closed and opening the valve when actuated, transducer means for actuating said pneumatic means to change the valve setting for regulating the feed of said solution in response to an electrical input, and electrical means sensing the load on the centrifugal and actuating said transducer means for changing the valve setting, said electrical means including one portion for maintaining a constant load on the centrifugal and to deactuate the trandsucer means so as to close the valve during on excessive centrifugal basket load and including another portion arranged to deactuate the trandsucer means during an excessive motor unlerload.

8. A feed control system for a continuous centrifugal having a motor driven basket and an inlet for solids containing solution, said system comprising a valve in said inlet, pneumatic means biasing the valve closed and opening the valve when actuated, transducer means for actuating said pneumatic means to change the valve setting for regulating the feed of said solution in response to an electrical input, and electrical means sensing the load on the centrifugal and actuating said transducer means for changing the valve setting, including a first electric circuit portion for gradually changing the setting of the valve means in response to a measured variation in the load on the motor so as to maintain said load constant and including another portion arranged to deactuate the transducer means during an excessive motor underload.

9. In a continuous centrifugal apparatus having a frusto-conical basket mounted for rotation, an inlet for solids containing solution to be treated, and a motor and motor circuit for rotating the basket, the improvement which comprises valve means in the inlet, pneumatic transducer means biasing the valve closed and opening the valve when actuated, sensing means in the motor circuit for measuring current drawn by the motor, and control means for the transducer means responsive to said sensing means including a first electric circuit portion for gradually changing the setting of the valve means in response to a measured variation in the load on the motor for maintaining a constant load on the basket, and a second electric circuit portion for deactuating said pneumatic transducer means so as to close the valve means during excessive motor underload.

10. In a continuous centrifugal apparatus having a frusto-conical basket mounted for rotation, an inlet for solids containing solution to be treated, and a motor and motor circuit for rotating the basket, the improvement which comprises valve means in the inlet, pneumatic transducer means biasing the valve closed and opening the valve when actuated, sensing means in the motor circuit for measuring current drawn by the motor, and control means for the pneumatic valve means responsive to said current sensing means including a first electric circuit portion for gradually changing the setting of the valve in response to a current variation in the motor circuit and a second electric circuit portion for closing said pneumatic valve means so as to close the inlet valve when the motor is not running in a loaded driving relation to the basket.

11. In a continuous centrifugal apparatus having a frusto-conical basket mounted for rotation, an inlet for solids containing solution to be treated, and a motor and motor circuit for rotating the basket, the improvement which comprises valve means in the inlet, pneumatic transducer means biasing the valve closed and opening the valve when actuated, sensing means in the motor circuit for measuring current drawn by the motor, and control means for the pneumatic transducer means and responsive to the sensing means including a first electric circuit portion to actuate the transducer means to maintain a substantially constant load on the rotor and to deactuate the pneumatic transducer means so as to close the inlet valve during an excessive rotor load and a second electric circuit portion arranged to deactuate the transducer means to close the inlet valve during an excessive motor underload.

12. In a continuous centrifugal apparatus having a frusto-conical basket mounted for rotation, an inlet for solids containing solution to be treated, and a motor and motor circuit for rotating the basket, the improvement which comprises valve means in the inlet, pneumatic transducer means biasing the valve closed and opening the valve when actuated, sensing means in the motor circuit for measuring current drawn by the motor, and control means for the pneumatic valve means responsive to said sensing means including a first electric circuit portion for gradually changing the setting of the inlet valve for regulating the feed of said solution through said inlet to maintain a constant load on the centrifugal basket and to deactuate the pneumatic valve means so as to close said valve during excessive centrifugal basket load and a second electric circuit portion for deactuating the pneumatic valve means so as to close the inlet valve during an excessive motor underload.

13. A feed control system as set forth in claim 12, wherein said pneumatic transducer means has an air input line and said pneumatic valve means includes a first electric-pneumatic valve for controlling air in said line and operatively associated with said first electric circuit portion, and a second electric-pneumatic valve for controlling air in said line operatively associated with said scond electric circuit portion.

References Cited

UNITED STATES PATENTS

| 1,847,159 | 3/1932 | Adams | 210—145 X |
| 2,941,712 | 6/1960 | Cook | 233—19 |
| 2,973,288 | 2/1961 | Reidel | 127—19 |
| 3,070,291 | 12/1962 | Bergey | 233—19 |
| 3,152,462 | 10/1964 | Elliot et al. | 210—143 X |

(Other references on following page)

UNITED STATES PATENTS 3,322,277  5/1967  Pearson et al. _____ 210—86 X
2,868,381  1/1959  Siegrist _____ 210—143

OTHER REFERENCES

"Antriebe Für Vollautomatische Zentrifugen . . ." H. Hinz, in Zucker 13, 535–539 (1960).

"Füllmassezulaufregelung . . ." M. Brunke in Zucker 18, 297–299 (1965).

"Chemical Engineer's Handbook" Perry, 4th ed. pp. 22–80, 22–82 (1963).

MORRIS O. WOLK, Primary Examiner

D. G. CONLIN, Assistant Examiner

U.S. Cl. X.R.

127—63; 210—143, 145; 233—19